United States Patent
Singh et al.

(10) Patent No.: US 8,335,207 B2
(45) Date of Patent: Dec. 18, 2012

(54) LINK MOBILITY TRACKING AND ITS APPLICATION TO MOBILE AD HOC NETWORKS

(75) Inventors: Shubhranshu Singh, Yongin-si (KR); Brian Mark, Fairfax, VA (US); Vamit Suri, Fairfax, VA (US); Yong-Sung Roh, Icheon-si (KR); Young-Gon Choi, Suwon-si (KR)

(73) Assignees: Samsung Electronics Co., Ltd., Suwon-si (KR); George Mason Intellectual Properties, Inc., Fairfax, VA (US)

( * ) Notice: Subject to any disclaimer, the term of this patent is extended or adjusted under 35 U.S.C. 154(b) by 966 days.

(21) Appl. No.: 11/321,071

(22) Filed: Dec. 30, 2005

(65) Prior Publication Data

US 2007/0153737 A1 Jul. 5, 2007

(51) Int. Cl.
*H04L 12/28* (2006.01)
*H04W 40/00* (2009.01)

(52) U.S. Cl. ......... 370/351; 370/238; 370/255; 455/445

(58) Field of Classification Search ............ 370/331, 370/238, 255, 351, 310, 315, 254, 400; 455/456.1, 455/446, 436, 458, 422.1, 424, 450, 445
See application file for complete search history.

(56) References Cited

U.S. PATENT DOCUMENTS

| | | | |
|---|---|---|---|
| 6,545,997 B1 * | 4/2003 | Bohnke et al. | 370/347 |
| 7,299,038 B2 | 11/2007 | Kennedy et al. | |
| 7,412,241 B2 | 8/2008 | Strutt | |
| 2002/0146983 A1 * | 10/2002 | Scherzer et al. | 455/67.1 |
| 2002/0186665 A1 * | 12/2002 | Chaffee et al. | 370/255 |
| 2004/0219909 A1 * | 11/2004 | Kennedy et al. | 455/422.1 |
| 2006/0007865 A1 * | 1/2006 | White et al. | 370/238 |
| 2006/0160540 A1 * | 7/2006 | Strutt et al. | 455/440 |
| 2006/0176834 A1 * | 8/2006 | Dickerson et al. | 370/260 |

FOREIGN PATENT DOCUMENTS

| | | |
|---|---|---|
| JP | 2004-336768 | 11/2004 |
| KR | 10-2006-0018882 | 3/2006 |

OTHER PUBLICATIONS

Decision on Grant issued Jul. 30, 21012 in counterpart Korean Application No. 10-2006-0040048 (5 pages, in Korean).

* cited by examiner

*Primary Examiner* — Wesley Kim
(74) *Attorney, Agent, or Firm* — NSIP Law

(57) ABSTRACT

Embodiments of the present invention provide a method for tracking link mobility between two mobile nodes. Each node estimates a link mobility state of a link between itself and each of its neighbor nodes, accumulates successively the link mobility states, estimates link mobility parameters using the successively estimated link mobility states, and predicts a link availability probability using the link mobility parameters. The link mobility tracking can be applied to various routing protocols so as to implement mobility aware routing which enhance the routing performance.

18 Claims, 5 Drawing Sheets

LINK MOBILITY TRACKING AND ITS APPLICATION TO MOBILE AD HOC NETWORKS

BACKGROUND OF THE INVENTION

1. Field of the Invention

The present invention relates generally to a mobile ad hoc network. More particularly, the present invention relates to a mobility aware routing technique using a novel link mobility tracking method.

2. Description of the Related Art

Mobile ad hoc networks (MANETs) are self-organizing, rapidly deployable, and require no fixed infrastructure. The MANET is comprised of wireless nodes, which can be deployed anywhere, and must cooperate in order to dynamically establish communications.

The flexibility of a highly dynamic MANET introduces many complexities into the tasks of network control and management, including routing, flow control, and power management, among others. For example, traffic routes change over time, subject to the movement of the mobile nodes. Each mobile node in a MANET acts as a router and moves in an arbitrary direction and speed, hence it is critical to effectively route the traffic to the destination with minimal overhead.

Many routing strategies have been proposed for MANETs that strive towards an optimum tradeoff between efficiency and responsiveness to topological changes. Typical ad hoc routing algorithms, however, tend to become inefficient when the network topology and link availability change frequently, due to the excessive overhead and delay required for re-routing and/or route repair. A key problem with these algorithms is that the routes are chosen based on criteria such as shortest number of hops, yet such routes may not remain available for the duration of a session. When a route failure occurs, a new route must be discovered and a large number of packets may have to be retransmitted. This results in lower network throughput and poorer quality-of-service.

In order to improve the routing performance of MANETs, a node mobility or location prediction concept has been proposed. In the node mobility based routing schemes, each node maintains and periodically checks a list of its neighbor nodes. The number of changes in the list from one sampling instance to the next is taken as a measure of the degree of mobility of the node. During the route discovery phase, the nodes with a high degree of mobility are avoided. The node mobility based routing scheme provides a coarse measure of route stability, but may unfairly penalize relatively stationary nodes that have highly mobile neighbors.

Mobility prediction schemes with a random walk model have been proposed for enhancing the node mobility based routing schemes. While the random walk model is useful for conceptual modeling, the model does not accurately reflect node movements in realistic scenarios. Moreover, estimating the state and parameters of the random walk model cannot be done satisfactorily in real-time.

As another approach, a location history-based mobility prediction scheme has been proposed. In this scheme, the location history of the mobile node is monitored and frequently traveled paths are assigned higher prediction probabilities. However, this scheme requires a large amount of memory to store the set of possible paths and may be cumbersome for mobile nodes.

Also, Global Positioning System (GPS) supported mobility prediction schemes have been proposed. In these schemes, the nodes are geolocated using GPS and their respective velocities are calculated using successive node positions. The node's velocity and position are used to predict the time remaining for the links between nodes to remain active. In the case of nodes with uniform velocities, this prediction scheme will perform well. However, if random changes occur in directions or magnitudes of the node velocities, the prediction will be erroneous.

SUMMARY OF THE INVENTION

The present invention has been made in an effort to solve the above and other problems, and it is an object of embodiments of the present invention to provide a link tracking method which can be applied to routing mechanisms in mobile ad hoc networks (MANETs) in order to improve overall performance.

In accordance with one aspect of the present invention, the above and other objects can be accomplished by a link mobility model. The link mobility tracking method includes estimating a link mobility state of the link between a pair of nodes, accumulating successively the link mobility states, estimating link mobility parameters using the successively estimated link mobility states, and predicting a link availability probability at any point of time using the link mobility parameters. The link mobility state between two nodes is defined by the relative distance between the nodes, relative velocity and relative acceleration.

In accordance with another aspect of the present invention, there is provided a method for determining a route from a source node to a destination node, directly or via at least one intermediate node, on the basis of stabilities of paths between the source and destination nodes in a mobile ad hoc network. The method includes calculating a stability of each path based on the link stabilities between neighbor nodes on the path, comparing the path stabilities of different routes, and selecting the path having the highest stability and hence improving the overall life of the path.

BRIEF DESCRIPTION OF THE DRAWINGS

The above and other objects, features, and advantages of embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described in detail hereinafter with reference to the accompanying drawings. In the following description of exemplary embodiments of the present invention, detailed descriptions of known functions and configurations will be omitted in the interest of clarity and conciseness.

The link mobility tracking technique adopted to the routing method of exemplary embodiments of the present invention advantageously requires only periodic signal measurements from neighbor nodes. The link mobility state is based on a first-order autoregressive model (AR-1), which incorporates relative distance, velocity, and acceleration information. The AR-1 model accurately models node mobility behavior. More importantly, the model lends itself to efficient and accurate real-time state estimation via Kalman filter and Minimum Mean Squared Error (MMSE) parameter estimation.

Figure 1:
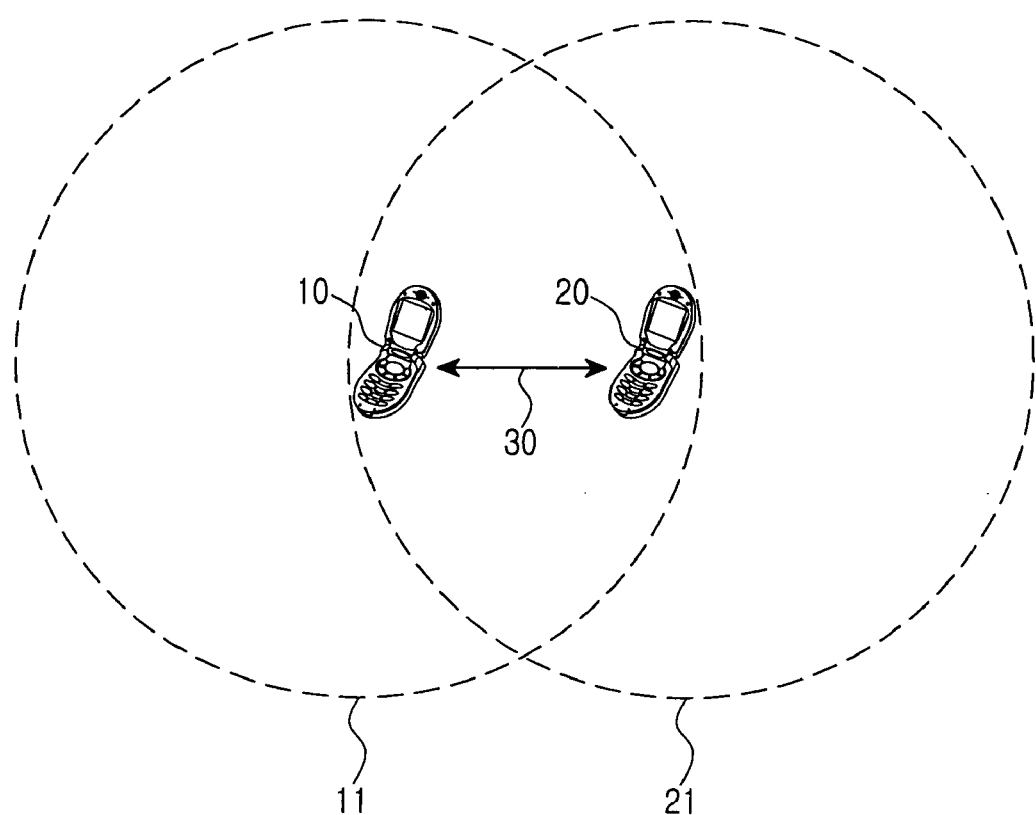
FIG. 1 is a schematic view of an ad hoc network for illustrating the link tracking-based routing method of exemplary embodiments of the present invention.

FIG. 1 is a schematic view of an ad hoc network for illustrating the link tracking-based routing method of exemplary embodiments of the present invention.

In consideration of a particular mobile node 10 in an ad hoc network, another node 20 in the network is defined to be a neighbor node if it lies within the radio transmission/reception range 11 of node 10.

In this case, a bidirectional wireless link 30 exists between nodes 10 and 20. This link 30 will continue to exist as long as nodes 10 and 20 remain within radio ranges 11 and 21 of each other, assuming they are also within line-of-sight (LOS). If the nodes 10 and 20 move apart, eventually the link will break. The purpose of the link mobility model is to predict, in advance, the availability of the link 30 at any particular point of time. The probability of link availability is used as a measure of link stability.

In exemplary embodiments of the present invention, a link mobility model, which is based on an autoregressive model of order one, AR-1 model for node mobility state, is exploited. However, in exemplary embodiments of the present invention the key factor is not the absolute mobility state of each node but the relative mobility state between a pair of nodes, that is, the link mobility state. The link mobility state between two nodes at time t instant n is defined by a (column) vector of equation (1):

$$s(t) = [d(t), \dot{d}(t), \ddot{d}(t)]' \quad (1)$$

where d(t) denotes the relative distance between the nodes, $\dot{d}(t)$ is the first derivative of d(t) or relative velocity, $\ddot{d}(t)$ is the second derivative of d(t) or relative acceleration and ' indicates the matrix transpose operator.

Note that the relative distance d(t) is always nonnegative, that is, d(t)≧0, but the relative velocity $\dot{d}(t)$ and relative acceleration may take on positive or negative values. A value of $\dot{d}(t)$<0 indicates that node Y is moving towards node X at time instant n, while a value of $\dot{d}(t)$>0 indicates that node Y is moving away from node X. A similar comment applies to the relative acceleration $\ddot{d}(t)$.

The information contained in the link mobility state captures dynamics of the relative distance between the two nodes of interest, and by inference, the behavior of the associated link.

The evolution of the link mobility state can be considered in discrete-time, assuming a uniform sampling interval T. The discrete-time link mobility state is defined by equation (2):

$$s_n \stackrel{\Delta}{=} s(nT) = [d_n, \dot{d}_n, \ddot{d}_n]', \quad -\infty < n < \infty \quad (2)$$

where $d_n \stackrel{\Delta}{=} d(nT)$, $\dot{d}_n \stackrel{\Delta}{=} \dot{d}(nT)$, and $\ddot{d}_n \stackrel{\Delta}{=} \ddot{d}(nT)$. By comparison, the node mobility state for two-dimensional space in the discrete-time AR-1 mode is defined by equation (3):

$$u_n = [x_n, \dot{x}_n, \ddot{x}_n, y_n, \dot{y}_n, \ddot{y}_n]' \quad (3)$$

where $(x_n, y_n)$ denote the (x,y)-position coordinates of the node at the discrete-time instant n. the components $\dot{x}_n$ and $\ddot{x}_n$ represent the velocity and acceleration in the x-direction, while components $\dot{y}_n$ and $\ddot{y}_n$ represent the velocity and acceleration in the y-direction, at time n.

Figure 2:
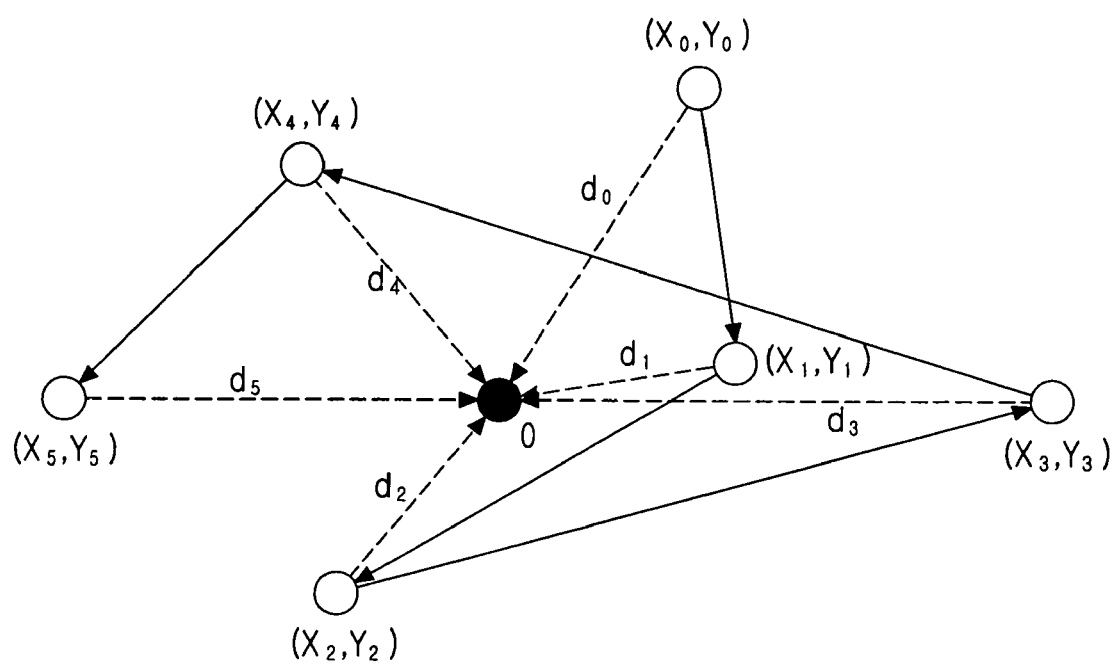
FIG. 2 is a conceptual view illustrating a concept of link mobility tracking according to an exemplary embodiment of the present invention.

FIG. 2 a conceptual view illustrating a concept of link mobility tracking according to an exemplary embodiment of the present invention.

In FIG. 2, a node O tracks the link and node mobility state of node X which is moving with respect to the node O. The node X is initially located at position $(x_0, y_0)$ and moves to the positions $(x_1, y_1), \ldots, (x_5, y_5)$, in sequence. The solid lines represent the trajectory taken by node X and the dashed lines represent the sequence of relative distance values $d_0, d_1, \ldots, d_5$. The node mobility tracking involves the estimation of the position sequence $\{(x_n, y_n)\}$, together with the corresponding velocity and acceleration sequences $\{(\dot{x}_n, \dot{y}_n)\}$ and $\{(\ddot{x}_n, \ddot{y}_n)\}$. By contrast, the link mobility tracking estimates the sequence of relative distance values $\{d_n\}$, together with the corresponding velocity and acceleration sequences $\{\dot{d}_n\}$ and $\{\ddot{d}_n\}$.

In order to extend the node mobility state to three-dimensional space, the state $u_n$ should be expanded to include the z-coordinate and the associated velocity and acceleration components in the z-direction. However, the form of the link mobility state does not change in this case.

The AR-1 model for the node mobility state $u_n$ is given as follows:

$$u_{n+1} = Bu_n + v_n \quad (4)$$

where B is a 6×6 transformation matrix, the vector $v_n$ is a 6×1 discrete-time zero mean, white Gaussian process with autocorrelation function $R_w(k) = \delta_k V$, where $\delta_0 = 1$ and $\delta_k = 0$ when k≠0. The matrix V is the covariance matrix of $v_n$.

In exemplary embodiments of the present invention, a mobility model similar to (4) is introduced to represent the evolution of the link mobility state. However, care must be taken to ensure that the computed value of $d_n$ is always positive. Thus, the link mobility state can be specified as equation (5):

$$s_{n+1} = sgn\langle As_n + w_n \rangle_1 \cdot (As_n + w_n) \quad (5)$$

where $\langle s \rangle_1$ denotes the first component of the vector s. The matrix A has the following form:

$$A = \begin{bmatrix} 1 & T & T^2/2 \\ 0 & 1 & T \\ 0 & 0 & \alpha \end{bmatrix} \quad (6)$$

and $w_n = [w_{n,1}, w_{n,2}, w_{n,3}]'$ is a 3×1 discrete-time zero mean, white Gaussian process with autocorrelation function $R_w(k) = \delta_k Q$, where $\delta_0 = 1$ and $\delta_0 = 1$, when $\delta_0 = 1$. The matrix Q is the covariance matrix of $v_n$. The term α is a parameter of the model that must be specified or estimated.

In the state equation (5), if the first component of $As_n + w_n$ is negative, $s_{n+1}$ should be set equal to —$(As_n + w_n)$. In this case, since the distance component has gone negative from time n to n+1, the polarities of all three components of the vector $As_n + w_n$ should be reversed in order to obtain the next state vector $s_{n+1}$. Similar to the node mobility state equation (3), the transformation $As_n$ in equation (5) captures the evolution of the state s from time n to time n+1, modulo the noise term $w_n$.

Let $g_n \triangleq \text{sgn}(d_n + \dot{d}_n T + \ddot{d}_n T^2/2 + w_{n,1})$.

Then the state equation (5) is equivalent to the following system of equations:

$$d_{n+1} = g_n \cdot (d_n + \dot{d}_n T + \ddot{d}_n T^2/2 + w_{n,1}) \quad (7)$$

$$\dot{d}_{n+1} = g_n \cdot (\dot{d}_n + \ddot{d}_n T + w_{n,2}) \quad (8)$$

$$\ddot{d}_{n+1} = g_n \cdot (\alpha \ddot{d}_n + w_{n,3}) \quad (9)$$

In practice, the sampling interval between successive link mobility states may not be uniform. Let $T_n$ denote the sampling interval between states $s_n$ and $s_{n+1}$ for n=0, 1, . . . Note that the transformation matrix A defined in (6) is a function of the sampling interval T, that is, A=A(T). If the sampling is nonuniform, then the transformation matrix should depend on the discrete-time index n as follows:

$$A_n \triangleq A(T_n). \quad (10)$$

Thus, the link state equation (5) can be written more generally as follows:

$$s_{n+1} = \text{sgn}\langle A_n s_n + w_n \rangle_1 \cdot (A_n s_n + w_n) \quad (11)$$

In general, the covariance matrix Q of the noise term $w_n$ could also depend on the discrete-time index n and hence can be denoted by $Q_n$.

The link mobility model given by (11) allows us to track the link state given a sequence of observation data. Signal measurements typically available in wireless networks such as received signal strength indicator (RSSI) or Time-of-Arrival (TOA) can serve as observation data for tracking link mobility. A single signal measurement of either kind is sufficient to perform link mobility tracking using a Kalman filter. For purpose of illustration, it is assumed that RSSI is used as the source of observation data, although TOA could just as easily be used instead.

A Kalman filter can be used to perform accurate link state estimation as long as the mobility characteristics of the link do not change significantly over time. The link mobility characteristics are defined by the parameters $A_n$ and $Q_n$. From the form of $A_n$, it can be seen that the only undetermined parameter is the parameter $\alpha$. If the link mobility characteristics change over time, state estimation will become inaccurate unless the mobility parameters $A_n$ and $Q_n$ are re-estimated. To accommodate changes in the link mobility parameters, an integrated link mobility and parameter estimator similar to the one described for the AR-1 node mobility model are exploited in exemplary embodiments of the present invention. The link parameter estimator uses the sequence of state estimates to re-estimate the link mobility parameters.

Assuming a lognormal shadowing model, the RSSI at time n, measured in dB, received at a given mobile node X from a neighbor node Y is given as follows:

$$o_n = k - 10\gamma \log(d_n) + \psi_n \quad (12)$$

where k is a constant determined by the transmitted power, antenna height, wavelength, and gain of the node Y, $\gamma$ is a slop index (typically $\gamma$ is between 2 and 5), $\psi_n$ is a zero mean, stationary Gaussian process with standard deviation $\sigma_\psi$, typically from 4 to 8 dB, as defined earlier. The propagation model (12) can be written in the form of an observation equation incorporating the link mobility state as follows:

$$o_n = h(s_n) + \psi, \quad (13)$$

where $$h(s_n) = k - 10\gamma \log(d_n). \quad (14)$$

The observation sequence $\{o_n\}$ for link mobility tracking consists of scalar values, whereas for node mobility tracking, the observation sequence consists of vectors containing at least three components. This is due to the fact that localization of a node in two-dimensional space requires at least three independent observations. By contrast, estimation of the relative distance between two nodes requires only a single signal measurement.

Although the link mobility state equation (5) does not, strictly speaking, represent a linear system, the system is approximately linear in practice because the term $[As_n + w_n]$ rarely falls below zero in realistic scenarios. This has been confirmed in numerical experiments. Therefore, a Kalman filter can be extended to estimate the link mobility state from the observation data. To that end, the observation signal $o_n$ is linearized as follows:

$$o_n = h(s_n^*) + H_n \Delta s_n + \psi_n, \quad (15)$$

where $s_n^*$ is the nominal or reference state vector and $\Delta s_n = s_n - s_n^*$ is the difference between the true and nominal state vectors. In the extended Kalman filter, the nominal vector is obtained from the estimated link mobility state at time n−1, that is, $s_n^* = \hat{s}_{n-1}$. The 1×3 vector $H_n$ is given by $$H_n = \frac{\partial h}{\partial s}\bigg|_{s=\hat{s}_{n-1}} = [-10\gamma/\langle \hat{s}_{n-1}\rangle_1, 0, 0]. \quad (16)$$

The steps in the extended Kalman filter are given below. In the extended Kalman filter, $\hat{s}_{n|n}$ denotes the state estimate at time n given the observation vector at time n and $\hat{s}_{n|n-}$ denotes the state estimate at time n given the observation vector at time n−1. in terms of the earlier notation, $\hat{s}_n = \hat{s}_{n|n}$.

Initialization:

$$\hat{s}_{0|-1} = 0. \quad 1)$$

$$M_{0|-1} = I_3 \quad 2)$$

Recursive estimation (n=1, 1, . . . ):

$$H_n = [-10\gamma/\langle \hat{s}_{n-1|n-1}\rangle_1, 0, 0] \quad 1)$$

$$K_n = M_{n|n-1} H'_n (H_n M_{n|n-1} H'_n + \sigma_\psi^2)^{-1} \quad 2)$$

Correction steps.

$$\hat{s}_{n|n} = \hat{s}_{n|n-1} + K_n(o_n - h(\hat{s}_{n|n-1})) \quad 3)$$

$$M_{n|n} = (I_3 - K_n H_n) M_{n|n-1} (I_3 - K_n H_n)' - \sigma_\psi^2 K_n K'_n \quad 4)$$

Prediction steps:

$$\hat{s}_{n+1|n} = \text{sgn}\langle A_n \hat{s}_{n|n}\rangle_1 A_n \hat{s}_{n|n} \quad 5)$$

$$M_{n+1|n} = A_n M_{n|n} A'_n + Q \quad 6)$$

Here, 0 denotes the 3×1 vector of all zeros, $I_3$ denotes the 3×3 identity matrix, $M_{i|j} \triangleq \text{Cov}(\hat{s}_{i|j})$, and $K_n$ is the Kalman gain matrix.

Due to the autoregressive form of the link mobility model, the MMSE estimates of the parameters A and Q can be obtained using a form of the Yule-Walker equation. Recall from (6) that the matrix A is determined by the parameter $\alpha$. The residual error at time n is defined by $$e_n \triangleq s_n - \hat{A}_{n-1} s_{n-1}, \quad (17)$$

where $\hat{A}_n$ denotes the MMSE estimate of $A_n$ at time n. The orthogonality principle requires that $$E[s'_{n-1} e_n] = 0 \quad (18)$$

From (18), the MMSE estimate of α at time n can be obtained as $$\hat{\alpha}_n = \begin{cases} r_n(1)/r_n(0), & \text{if } r_n(1) \neq 0 \\ 0, & \text{otherwise} \end{cases} \quad (5)$$

where $$r_n(0) = E[(\ddot{d}_n)^2]$$

and $$r_n(1) = E[\ddot{d}_n \ddot{d}_{n-1}].$$

Given $\hat{\alpha}_n$, the estimate $\hat{A}_n$ is completely determined by (6) and the sampling interval $T_n$. The corresponding estimate for the noise covariance matrix $Q_n$ is calculated as follows:

$$\hat{Q}_n = \frac{1}{n} \sum_{i=1}^{n} e_i e_i'. \quad (21)$$

The link mobility state estimates $\hat{s}_n$ which are obtained using the extended Kalman filter, are used to re-estimate the model parameters at time n. the steps involved in estimation the link mobility parameters are listed below.

Initialization:

$$a_2 = \langle \hat{s}_1 \rangle_3 \quad 1)$$

$$\hat{A}_2 = \hat{A}, \hat{Q}_2 = \hat{Q} \quad 2)$$

$$r_2(0) = \hat{r}(0), r_2(1) = \hat{r}(1) \quad 3)$$

where the initial parameter values $\hat{A}$, $\hat{Q}$, $\hat{r}(1)$, and $\hat{r}(1)$ can be determined from a set of training samples.

Link mobility parameter estimation (n=3, 4, ...):

1) $e_n = s_n - \hat{A}_{n-1} s_{n-1}$

2) $\hat{Q}_n = \frac{1}{n-1}[(n-2)\hat{Q}_{n-1} + e_n e_n']$

3) $a_n = \langle \hat{s}_n \rangle_3$

4) $r_n(0) = \frac{1}{n-1}[(n-2)r_{n-1}(0) + a_n^2]$

5) $r_n(1) = \frac{1}{n-2}[(n-3)r_{n-1}(1) + a_{n-1} a_n]$

6) Obtain $\hat{A}_n$ from $\hat{\alpha}_n = r_n(1)/r_n(0)$.

The link mobility parameter estimates $\hat{A}_n$ and $\hat{Q}_n$ depend only on the estimated state sequence up to $\hat{s}_n$. Therefore, $\hat{A}_n$ and $\hat{Q}_n$ can be applied in the prediction step of the Kalman filter in place of $A_n$ and $Q_n$, respectively. This results in a joint link mobility state and estimation scheme, which combines the Kalman filter-based state estimation, with the MMSE parameter estimation as discussed above.

Given the link mobility model, which is estimated in real-time as mentioned above, a link stability metric can be derived based on the predicted probability of link availability at a future time.

Suppose the link mobility state between two nodes X and Y is tracked using the joint state and parameter estimation scheme explained above. From the prediction steps (5 and 6) of the extended Kalman filter, the one-step predicted link mobility state estimate at time n+1 given the set of all observations up to time n is given by $$\hat{s}_{n+1|n} = sgn \langle A_n \hat{s}_{n|n} \rangle_1 A_n \hat{s}_{n|n} \quad (22)$$

And the corresponding covariance matrix is given by $$M_{n+1|n} = A_n M_{n|n} A'_n + Q_n.$$

The predicted relative distance estimate at time n+1 given the set of observation up to time n is given by $$\hat{d}_{n+1|n} = \langle \hat{s}_{n+1|n} \rangle_1 \quad (24)$$

The corresponding variance of $\hat{d}_{n+1|n}$ is given by $$\sigma_{n+1|n}^2 = \langle M_{n+1|n} \rangle_{(1,1)} \quad (25)$$

Then $d_{n+1|n}$ is Gaussian-distributed with approximate mean $\hat{d}_{n+1|n}$ and variance $\sigma_{n+1|n}^2$.

Let $d_{th}$ be the transmission/reception range of nodes in the network. It is assumed for simplicity that all nodes have the same transmission/reception range. Then the probability that the link between nodes X and Y will remain active at time n+1, given the set of observations up to time n can be expressed as follows:

$$p_{n+1|n} \triangleq P[d_{n+1|n} \leq d_{th}] \quad (26)$$

$$= \frac{1}{\sqrt{2\pi}\sigma_{n+1|n}} \int_0^{d_{th}} e^{\frac{-(x-\hat{d}_{n+1|n})}{2\sigma_{n+1|n}^2}} dx$$

$$= Q\left(\frac{d_{th} - \hat{d}_{n+1|n}}{\sigma_{n+1|n}}\right) - Q\left(\frac{-\hat{d}_{n+1|n}}{\sigma_{n+1|n}}\right)$$

where $$Q(x) \triangleq \frac{1}{\sqrt{2\pi}} \int_x^\infty e^{-y^2/2} dy$$

denotes the standard Q-function. In principle, the one-step predicted link availability probability could be extended to an m-step predicted value by repeating the Kalman filter prediction step to derive approximations for $\hat{d}_{n+m|n}$ and $\sigma_{n+m|n}$. In exemplary embodiments of the present invention, however the probability $p_{n+1|n}$ is taken as a measure of the stability of the link between node X and Y at time n, which is denoted by $p_n(X,Y)$.

Consider a multi-hop path $R = \{S, I_1, I_2, \ldots, I_{l-1}, D\}$, where S is the source node, D is the destination node, and the nodes $I_i$ are intermediate nodes. The path stability metric for R at time n is defined as the minimum of the link stability metrics (at time n) of the links comprising R. That is, $$p_n(R) \triangleq min\{p_n(S,I_1), \ldots, p_n(I_{l-1},D)\}. \quad (27)$$

Hence, the path stability is determined by the stability of the "weakest" link. This definition of path stability makes intuitive sense, since the breakage of any of the constituent links in a given path results in the breakage of the corresponding route in the network.

In practice, when the path stability metric is used to select among a set of alternative routes, it should be mapped to a set of discrete values, in order to reflect the fact that the computed link availability probabilities are only estimates. As an example, the discrete set of path stability values, for the purposes of path selection, could be set to $\{0, 0.1, 0.2, \ldots, 0.9, 1\}$. In this case, two paths with computed path stability values of 0.91 and 0.94 would be both considered to have the same path stability metric of 0.9, assuming the computed values are rounded to the nearest tenth. In this case, another performance metric, such as hop count, should be used to make a choice between the two paths.

The path stability metric can be incorporated into in the route discovery phase of any MANET routing protocol to promote the selection of more long-lived routes. The use of the path stability metric as the primary metric for route discovery may result in the selection of longer paths, with respect to more conventional shortest-hop routing protocols. However, the selection of more stable routes may lead to fewer route breakages, and hence higher overall throughput.

A link mobility tracking-based routing method according to one embodiment of the present invention will now be described.

A generic mobility-aware MANET routing protocol typically consists of three main components: link mobility tracking, route discovery, and route maintenance.

Each node in a network tracks the link mobility corresponding to the link to each of its neighbors. That is, for each neighbor, the link mobility state and parameter estimation procedure is carried out. In order to perform link mobility tracking, the node must obtain observation data from received signal information such as RSSI or TOA, from each of its neighbors on a regular, if not necessarily periodic, basis. Signal information such as RSSI could derived from any type of packet received from the neighbor node, such as special control packets such as HELLO messages, data packets, ACK packets, and the like.

In the simplest scenario, a node receives a packet at periodic time intervals of length T. At the $n^{th}$ packet reception instant, the link mobility state estimates $\hat{s}_{n|n}$ and $\hat{s}_{n+1|n}$ are updated according to the Kalman filter procedure. Similarly, the link mobility parameter estimates and $\hat{A}_n$ and $\hat{Q}_n$ are computed. Finally, given the predicted link mobility state $\hat{s}_{n+1|n}$, the link stability metric is computed.

In the route discovery phase, a route is selected from among several alternative paths in order to transmit a packet or a sequence of packets from a source to a destination node. In a mobility-aware routing protocol, the route with the largest path stability metric should be chosen.

When the stability metric along a path is computed, the most recent link mobility information available should be used. It may happen, however, that at the instant of a path metric computation at a node, the corresponding link mobility information may be stable. This may occur if the packets received on the link do not arrive at periodic, regular intervals. Consider the case, for example, when a periodic sequence of HELLO packets is received at intervals of time T at a node, but one of the HELLO packets is lost or dropped, such that the interval between a particular pair of HELLO packets becomes 2T, rather than T. If path metric computation is invoked at some time during this irregular interval, the time at which the last HELLO packet was received could be as much as 2T time units in the past. There is also no guarantee that the next HELLO packet will arrive at the expected time epoch in the future.

To alleviate this problem, the predictive power of the link mobility model can be exploited. In the example above, suppose that HELLO packets are sent by a neighbor node at times t=T, 2T, ... The (n+1)st HELLO packet is not received by the node for some reason. However, a path stability metric computation involving the given node is invoked at time $t_0=nT+\tau$, where $\tau>T$. At time $t_0$, the most recent link mobility state update occurred $\tau$ units earlier, at time nT, using the HELLO packet received at that time instant as observation data. Rather than using the link mobility state estimate $\hat{s}_{n+1|n}$ and the corresponding covariance matrix $M_{n+1|n}$, which may represent stale information, an updated link mobility state estimate can be obtained by using a prediction step similar to the one in the Kalman filter procedure as follows:

$$\hat{x}_{n+1|n}=sgn(\hat{A}_n(\tau)\hat{s}_{n+1|n})_1\hat{A}_n(\tau)\hat{s}_{n+1|n}. \quad (28)$$

The covariance matrix corresponding to $\hat{x}_{n+1|n}$ is computed as follows:

$$G_{n+1|n}=\hat{A}_n(\tau)M_{n+1|n}\hat{A}_n(\tau)+\hat{Q}_n. \quad (29)$$

Then $\hat{x}_{n+1|n}$ and $G_{n+1|n}$ can be used to compute a new link stability metric, which will be more current than the one computed at time $G_{n+1|n}$ based on $G_{n+1|n}$ and $M_{n+1|n}$.

After a route has been chosen to transmit packets between a given source and destination node pair, link mobility tracking should continue to take place on all nodes on the corresponding path. If the link stability metric of any link on the path falls below a threshold value, $p_{th}$, a link breakage warning event is said to occur. As part of route maintenance, the occurrence of a link breakage event invokes some type of route repair procedure. For example, the upstream intermediate node of the link may send a message to the source node to initiate a new route discovery procedure. Alternatively, some ad hoc routing protocols perform "route repair," whereby the intermediate node searches, if possible, for a subpath around the failed link. In this case, the source node does not need to be notified about the link breakage warning event.

The main benefit of the link stability metric is its ability to predict the onset of link breakage. This allows re-routing and/or route repair procedures to be initiated before packet loss occurs. In other words, the link breakage warning serves as a type of re-routing or route repair trigger.

Proactive routing protocols maintain network topology information by periodically broadcasting link status information in the network. The link stability information computed by a node can be incorporated relatively straightforwardly into the link state broadcasts of a proactive routing protocol. The periodic advertisement of link state or HELLO packets, can provide the observation data required for link mobility tracking. A given node X only needs to receive packets on a periodic basis from each of its neighbor nodes in order to track the stability of the corresponding links.

Optimized link state routing (OLSR) protocol is a representative example of a proactive MANET routing protocol. To make OLSR "mobility-aware," the link mobility state information can be calculated by each of the nodes based on periodically advertised HELLO messages. Link stability information can be disseminated throughout the network using the so-called Topology Control (TC) messages. A translation lookaside buffer (TLB) option can be used in conjunction with the TC messages for this purpose. The type-length-value (TLV) option is appended at the end of the TC message. Nodes not supporting the mobility-aware feature can simply ignore this option in order to maintain compatibility with standard OLSR.

Periodic neighbor discover and link state dissemination procedures may or may not be available in reactive routing protocols. Instead, route request and route reply messages can be used to disseminate link status information for most reactive protocols, it may be necessary to introduce periodically generated HELLO packets in order to perform link mobility tracking.

In the case of Ad-hoc On-demand Distance Vector (AODV), a source node sends a route request message, PREQ, to the destination which in turn replies with the route reply message, RREP, message if it has a valid route to the destination. Each of. the intermediate nodes between the source and destination calculates and appends the link stability metric value to the RREP/RREQ in case the value is lower than the current value indicated in the received RREP/RREQ message. Intermediate nodes forward the RREQ packets among its neighbor node to the one which has largest link stability value. Finally, RREP messages from the destination node to the source node follow the same path in the reverse direction. Hence, the source node learns the path which has the minimum link stability metric value, which corresponds to the path stability metric, as defined in (27).

As explained above, the link stability metric can be applied to generic proactive and reactive routing protocols.

For the purpose of simulation and performance analysis, a mobility-aware version of the reactive routing protocol called Dynamic Source Routing (DSR) has been implemented in the ns-2 simulation environment. The DSR protocol presents some challenges due to the fact that it does not use periodically advertised messages such as HELLO messages.

In the Mobility-Aware DSR (MA-DSR) protocol a periodically advertised on-hop message is required for the purpose of link stability metric computation. Unlike other reactive routing protocols such as AODV, conventional DSR does not use periodic on-hop messages. Thus the one-hop HELLO message has been introduced into MA-DSR. Implementation of HELLO messages in the MA-DSR increases the overall control signal overhead in the network compared with the original DSR. However, this extra overhead is compensated by the reduction in route breakages, RERR messages (route error messages), and route discovery messages due to the more stable route selection of MA-DSR.

The number of HELLO messages generated can be reduced significantly by employing various optimizations. For example, in the case of IEEE 802.11x, the RTS/CTS/ACK or beacon signals can be used in place of the HELLO messages to provide signal strength information to neighbor nodes. Moreover, nodes that are part of active routes can obtain signal strength information from data packets, as well as ACK packets. The signal measurements provided by the observation data for link mobility tracking do not have to arrive at uniformly spaced time intervals. Moreover, the potential problem of missing observation data can be alleviated by exploiting the prediction step of the Kalman filter.

A node tracks the mobility state of its link to a neighbor node by means of the received signal measurements from HELLO messages or other types of packets, as discussed above. If the node fails to receive a packet from its neighbor after a time $\tau_{gap}$ from the last packet reception instance, the link is considered to be broken. Normally, the link stability metric will indicate in advance when a link is about to break due to node mobility. However, in some cases, such as, when the two nodes are suddenly separated by an obstructing object, the link stability metric fails to anticipate the loss of the link. Therefore, the timeout mechanism using $\tau_{gap}$ is needed to accommodate such scenarios.

A node disseminates a route request message, RREQ when it determines that it needs a route to a destination but does not have any valid route in its route cache. A valid route is one for which the path stability metric is greater than the stability threshold $p_{th}$. As in the regular DSR cache maintenance procedure, stable routes are automatically purged from the cache.

In MA-DSR, each of the intermediate nodes along the path from the source to the destination continuously calculates the link stability metric. When a RREQ message is received by an intermediate node on the route, the node first checks its route cache as in conventional DSR. Two outcomes are possible:

a) The intermediate node finds a valid route to the destination node.

b) The intermediate node does not find a valid route to the destination node.

In the first case, the intermediate node sends a RREP message to the source node containing that path to the destination that it discovered through itself, along with the associated path stability value. Here the RREQ is not propagated further.

In the second case, the intermediate node updates the current value of the path stability metric stored in the data part of the RREQ message. More precisely, the path stability value in the RREQ message is replaced with the intermediate node's link stability value if this value is smaller than the current value indicated by the RREQ. The RREQ message is then broadcast further, towards the destination node. In this way, any RREQ message that arrives along a path to the destination node contains the correct path stability value, the minimum link stability value along the path traversed by the RREQ as defined in (27).

When the destination node receives the RREQ message, it searches its own route cache for the best available route (if any) to the source node. The destination node compares the path stability value stored in the RREQ message with the path stability value of its best available route. Out of the two routes, the one having the smaller path stability value is stored in the data part of a new RREP message, which is sent to the source node on the reverse path corresponding to the source route stored in the RREQ header. Thus, RREP messages are sent to the source node along all the paths corresponding to the received RREQs. In this way, the source node learns the path stability metric of multiple alternative routes from the source to the destination. The source node uses the path which has the maximum path stability value. The number of hops or other types of path metrics may be used for the purpose of breaking ties between routes having the same path stability value.

Each of the nodes keeps updating the link stability metric by performing link mobility tracking. In case the link stability value falls below to the threshold value, $p_{th}$, it sends a "link breakage warning" message, called LWARN, which is similar to the route error packet RERR in DSR, to the source node, indicating that the probability of link breakage in the next time step is very high and appropriate steps should be taken.

The source node, upon receiving LWARN, will 1) scan its route cache and purge all routes containing this link; 2) this will automatically cause packet transmission along all of these routes to be stopped; 3) start a fresh route discovery process for all buffered packets that were using the deleted routes. Similar to the RERR message in DSR, the LWARN message is snooped by intermediate nodes on the path, which perform updates to their route caches similar to the source node. The difference between RERR and LWARN lies in the trigger mechanism. LWARN is triggered by the link stability metric falling below a threshold (proactive), whereas RERR is triggered by the packet loss on the link (reactive).

The simulation results of the link mobility tracking and mobility-aware DSR according to exemplary embodiments of the present invention will now be described.

To evaluate the link tracking, the link mobility behavior between a pair of mobile nodes was simulated using Matlab. The serving area is assumed to be a 800 m×800 m square bounded by the points (−400, −400) and (400, 400). Since the link mobility state captures the relative distance, velocity, and acceleration between the two nodes, one of the nodes, labeled O, can be fixed at the origin (0,0) system without loss of generality. The other node, labeled X, moves in the serving area according to the random waypoint model.

Figure 3:
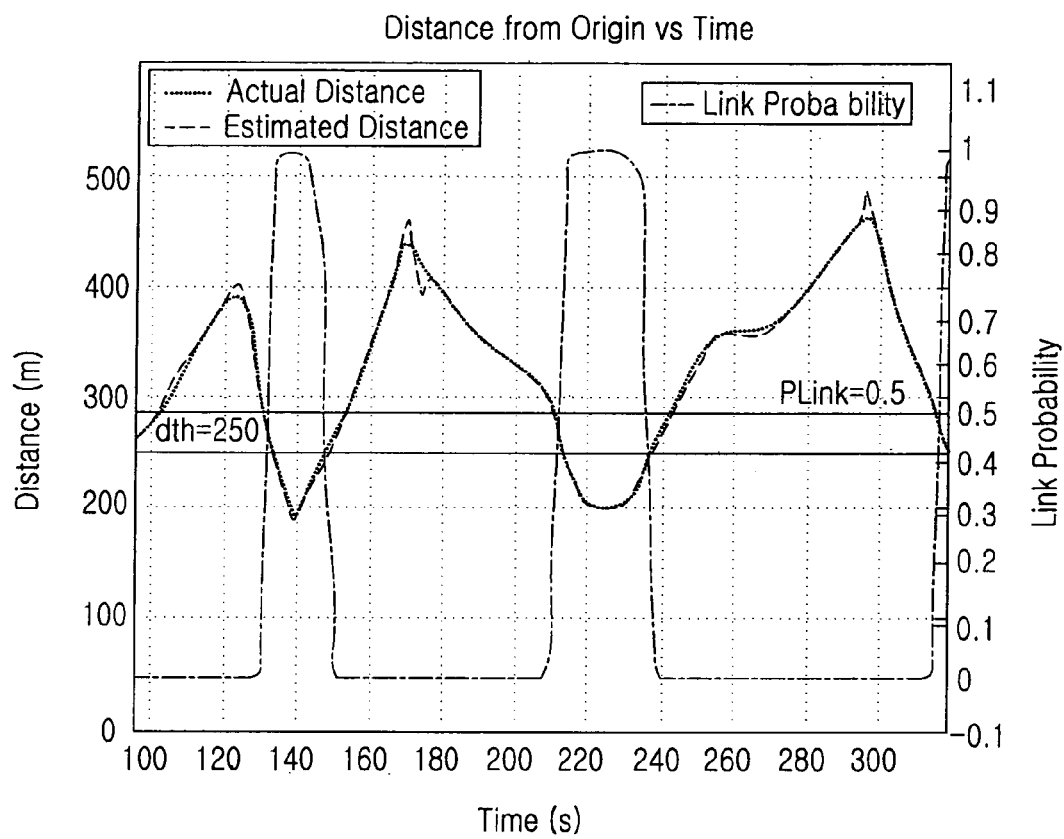
FIG. 3 is a graph showing a simulation result of relative distance tracking according to an exemplary embodiment of the present invention.

FIG. 3 is a graph showing a simulation result of relative distance tracking according to an exemplary embodiment of the present invention.

Node O tracks the link mobility state between itself and node X. The mobility of node X is governed by a random waypoint model with velocity uniformly distributed in the range [5, 15] m/s and a pause time of zero, which represents the highest degree of mobility. The transmission/reception range is set to $d_{th}$=250 m. The link stability threshold is set to $p_{th}$=0.5. The signal propagation parameters in (12) are set to k=0 and γ=3. The variance of the noise process $\psi_n$ is set to $\sigma_{104}$=4 dB.

In FIG. 3, the vertical axis on the left represents the relative distance in units of meters, while the right-hand vertical axis represents the link stability metric, taking values in the range [0,1]. The estimated relative distance trajectory is obtained from the link mobility tracking procedure of exemplary embodiments of the present invention. The sampling interval is assumed to be a constant T=2 s. As shown in FIG. 3, the estimated distance tracks the actual distance closely over the observation interval. The graph also shows the trajectory of the link stability metric computed by node O. Observe that the link stability metric trajectory always crosses the threshold $p_{th}$ in the vicinity of a crossing, in the opposite sense, of the estimated distance trajectory with respect to the threshold $d_{th}$. That is, an upcrossing of $p_{th}$ always corresponds to a downcrossing $d_{th}$ and vice versa.

Figure 4:
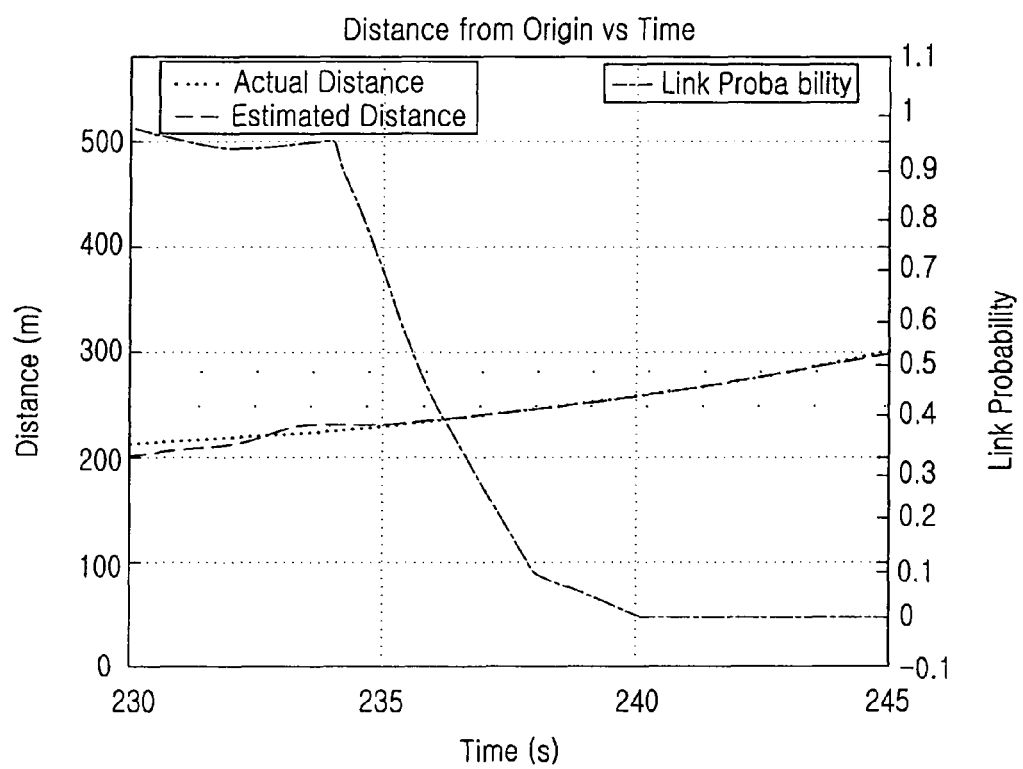
FIG. 4 is an enlarged view of the relative distance tracking graph of FIG. 3 in the vicinity of the threshold crossing between t=235 s and t=240 s.

FIG. 4 is an enlarged view of the relative distance tracking graph of FIG. 3 in the vicinity of the threshold crossing between t=235 s and t=240 s.

As shown in FIG. 4, the downcrossing of the link stability curve with respective to $p_{th}$ just prior to t=236 s occurs approximately 2 s before the upcrossing of the relative distance curve with respective to $d_{th}$. This implies that the link stability metric is able to anticipate the breakage of the link approximately T=2 s in advance of the link breakage event. As mentioned above, the link stability metric is defined in terms of the estimated probability of link available one time unit into the future. FIG. 3 and FIG. 4 validate the predictive power of the link stability metric.

Figure 5:
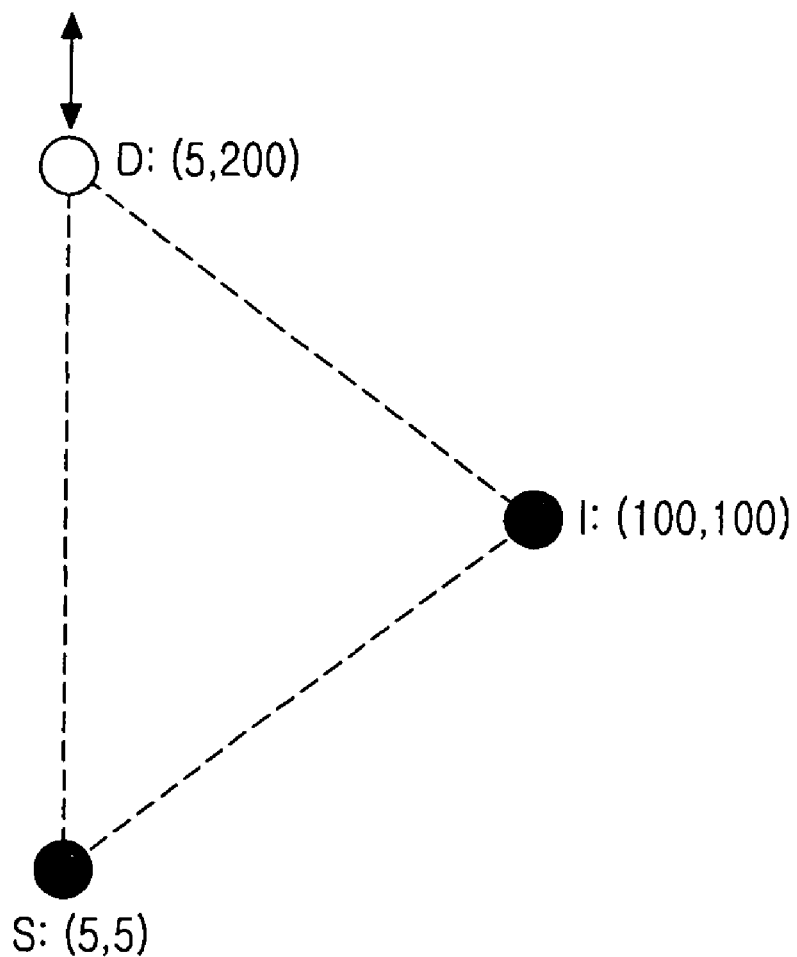
FIG. 5 is an exemplary view of a triangular mobility scenario for evaluating functionality of MA-DSR with link mobility tracking technique according to an exemplary embodiment of the present invention.

FIG. 5 is an exemplary view of triangular mobility scenario for evaluating functionality of MA-DSR with link mobility tracking technique according to an exemplary embodiment of the present invention.

As shown in FIG. 5, a simple deterministic network scenario consisting of three nodes S, I, and D is constructed. The source node S sends Constant Bit Rate (CBR) traffic using User Datagram Protocol (UDP) as the transport layer to the destination node D. Node I is a third node that could be used as an intermediate node on a path from S to D. Initially, the coordinates of the three nodes are as shown in FIG. 5, that is, node S is at location (5, 5), node I is at (100, 100), and node D is at (5, 200), where the unit of distance is meters. The packet transmission rate of source node S is 4 packets per second and the packet size is assumed to be a constant value of 64 bytes. The node transmission/reception range is $d_{th}$=250 m. The lognormal path loss model of (12) is assumed as the wireless propagation model.

For MA-DSR, the link/path stability threshold is set to $p_{th}$=0.4. The link/path stability metrics are computed as floating point numbers in the range [0, 1]. However, for the purpose of comparing path stability metrics among alternative routes, all path stability values are rounded to the nearest tenth. For example, a path with stability value 0.91 will be viewed as having the same value as a path with stability value 0.945, that is, the value 0.9. Recall that when the path stability metric is the same for two routes, another metric is used to break the ties. In this case, the hop count is used as the tie-breaking rule.

The initial configuration of the nodes is such that d(S,I)=d (I,D)<$d_{th}$, and d(S,D)<$d_{th}$. Both I and S are always stationary, but after an initial pause time of about 10 s, node D starts to move upwards vertically at a constant speed of 10 m/s, away from both S and I. The motion is such that after some time D will be out-of-range of S and then eventually also out-of-range of I. Node D stops at the position (5, 600), pauses for about 5 s, and then retraces its trajectory in the reverse direction, again at the constant speed of 10 m/s. eventually, node D starts coming back in-range of first node I and then in-range of node S as it returns to the starting position (5, 200). After returning to its initial position, node D again moves upwards along the vertical axis, repeating its initial movement pattern. This oscillatory movement pattern can be continued during a cycle of node D moving away from its starting position and then returning to the same point.

Now the operation of the MA-DSR according to an exemplary embodiment of the present invention will be described in the scenario of FIG. 5.

Initially, due to the exchange of HELLO messages between S and D, node S does not need to perform a route discovery as in DSR. Rather, node S immediately starts using the [S→D] route learned from the exchange of HELLO messages between nodes S and D. Since S is also tracking D, after some time, the path stability value of this route will become less than the threshold $p_{th}$. When this happens, node S will stop using this and start a fresh route discovery to learn of a new route to D, which is [S→I→D] route. Note that no packets should be dropped during the transition from the path [S→D] to the path [S→I→D], unlike in DSR.

After D moves out-of-range of node I, the link stability value, p(ID), of the link between I and D will fall below $p_{th}$. This will cause an LWARN message to be generated, which will eventually received by node S. At this point, node S will stop packet transmission (packets will be buffered at the network layer by MA-DSR) and initiate a fresh route discovery phase. Again, unlike conventional DSR, no packets should be dropped during this transitional phase, due to the predictive power of the link stability metric.

When D moves back into range I, node D will learn that I is a neighbor though the exchange of HELLO messages and link mobility tracking will resume. Eventually, node S will send a RREQ message. When node I receives the RREQ, it will find a valid route to D in its route cache. Node I will then reply with RREP to node S containing route [S→I→D]. Packets will then resume transmission on this route. When node D comes back in the range of S, node S will know about the shorter route to D via the HELLO packets, after the $P_{SD}$ attains or exceeds value as $P_{DI}$. Node S then starts using the route from S to D. Note that in MA-DSR no RERR messages are generated in the scenario of FIG. 5.

The main results from the ns-2 simulation of the triangle scenario for conventional DSR and MA-DSR according to an exemplary embodiment of the present invention are summarized in table 1.

TABLE 1

|  |  | Node S | Node I | | Node D |
|---|---|---|---|---|---|
|  |  | TX | TX | RX/drop | RX/drop |
| Conventional | MAC | 494 | 458 | 347/27 | 402/47 |
| DSR | Network | 458 | 470 | 347/1 | 402/0 |

TABLE 1-continued

|  |  | Node S | Node I | | Node D |
| --- | --- | --- | --- | --- | --- |
|  |  | TX | TX | RX/drop | RX/drop |
| MA-DSR | MAC | 413 | 389 | 355/11 | 384/23 |
|  | Network | 384 | 355 | 355/0 | 384/0 |

The simulation time was approximately 100 s, which corresponds roughly to one cycle of node D moving vertically upward, pausing, and then returning vertically downward to its initial position. Since this pattern can be repeated indefinitely, it suffices to examine the results of a single cycle.

As for the conventional DSR, Table 1 reports packets statistics at the MAC and network layers for the three nodes S, I, and D over the course of a simulation run using DSR. At node S, 384 packets are generated by the application-layer CBR source and passed to the network layer. According to the table 1, node S transmits 458 packets. This includes the 384 packet generated by the application layer plus additional 74 packet retransmissions performed by DSR in response to route breakages. At the MAC layer, node S transmits 494 frames. Thus, in addition to the 458 packets generated at the network layer, an additional 36 MAC-level frames have to be retransmitted. This is due to collisions occurring at the MAC layer. As for the conventional DSR, node I receives 347 packets at the network layer and the same number of frames at the MAC layer. However, 1 packet is dropped at the network layer and 27 frames are dropped at the MAC layer. This is due to packet/frame drops that occur when the source route is changed form [S→D] to [S→I→D] and vice versa. Also, node D receives 402 packets, but drops 47 packets, again due to the switching between the two routes that occurs during the course of the simulation.

In the meantime, the MA-DSR does not perform any packet retransmissions at the network layer, in contrast to conventional DSR. However, at the MAC layer, node S transmits 413 frames, which implies that 29 MAC level frames are retransmitted by node S. This number of MAC level retransmissions is significantly fewer than that in conventional DSR. Observe that node I receives and transmits 355 packets at the network layer, with no packet drops. At the MAC layer, node I transmits 458 frames and receives 347 frames with 27 frame drops. This indicates that the number of MAC level retransmissions and packet drops at node I is significantly less for MA-DSR compared with DSR. Finally, the destination node D receives 384 packets at both the network and MAC layers. At the MAC layer, 23 additional frames are dropped at node D.

The results given in table 1, lead to the conclusion that the application of link mobility tracking to DSR can potentially result in significant performance gains. Recall that the packet statistics shown in the table 1 correspond to only one cycle of the up and down movement of node D. If the simulation is run over M cycles, the packet statistics shown in the table 1 would increase by a factor of M. Thus, the performance gain of MA-DSR over conventional DSR should be viewed in terms of the percentage improvement.

It is remarked that while the triangle scenario is rather contrived, it does clearly illustrate the benefit of applying link mobility tracking to DSR. The simulation results are in accordance with the expected performance characteristics of MA-DSR and conventional DSR, respectively. In general, it would be expected that the performance benefits of mobility-aware routing with respective to conventional MANET routing should become more pronounced as the relative mobility of the nodes in the network increases. In such scenarios, the network topology changes often, resulting in frequent route breakages. By applying link mobility tracking, more stable routes can be selected in the route discovery phase and re-routing/route repair procedures can be invoked in advance of actual link breakage events.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for tracking link mobility between two mobile nodes, comprising:
   estimating, at each mobile node, a link mobility state between a pair of mobile nodes;
   accumulating successively the link mobility states;
   estimating link mobility parameters using the successively accumulated link mobility states;
   predicting a link availability probability using the estimated link mobility parameters; and
   tracking continuously a link stability metric of nodes being on a path between the pair of mobile nodes after transmitting packets between the pair of mobile nodes using the predicted link availability probability,
   wherein the link mobility state is determined by a relative distance, a relative velocity, and a relative acceleration between the pair of mobile nodes.

2. The method of claim 1, wherein the link mobility state is estimated with observation data received from each of neighbor mobile nodes.

3. The method of claim 2, wherein the observation data includes a received signal strength indicator (RSSI).

4. The method of claim 2, wherein the observation data includes Time-of-Arrival (TOA).

5. The method of claim 1, wherein the link mobility state is computed by an equation:
$S_{n+1} = \text{sgn}\langle AS_n + W_n \rangle_1 \cdot (AS_n + W_n)$, $\langle s \rangle_1$ denotes a first component of a vector S, $$A = \begin{bmatrix} 1 & T & T^2/2 \\ 0 & 1 & T \\ 0 & 0 & \alpha \end{bmatrix},$$

T denotes a sampling interval between $s_n$ and $s_{n+1}$, $\alpha$ is a parameter of a mobility model, $W_n = [W_{n,1}, W_{n,2}, W_{n,3}]'$ is a 3×1 discrete-time zero mean, white Gaussian process with autocorrelation function $R_w(k) = \delta_k Q$ where $\delta_0 = 1$ and $\delta_k = 0$ when $k \neq 0$, and ' is the matrix transpose operator.

6. The method of claim 5, wherein the link mobility parameters are A and Q.

7. The method of claim 6, wherein the link availability probability is computed by an equation:

$$p_{n+1|n} \triangleq P[d_{n+1|n} \leq d_{th}]$$

$$= \frac{1}{\sqrt{2\pi\sigma_{n+1|n}}} \int_0^{d_{th}} e^{\frac{-(x-\hat{d}_{n+1|n})}{2\sigma_{n+1|n}^2}} dx$$

-continued $$= Q\left(\frac{d_{th} - \hat{d}_{n+1|n}}{\sigma_{n+1|n}}\right) - Q\left(\frac{-\hat{d}_{n+1|n}}{\sigma_{n+1|n}}\right)$$

where $d_{th}$ is transmission/reception range of mobile nodes, $$Q(x) \triangleq \frac{1}{\sqrt{2\pi}} \int_x^\infty e^{-y^2/2} dy$$

denotes the standard Q-function, $d_{n+1|n}$ and $\sigma_{n+1|n}$ are predicted link distance and standard deviation at time n+1 with observations up to time n.

8. The method of claim 1, further comprising utilizing the relative distance to estimate the link mobility state between the pair of mobile nodes.

9. A method for deciding a route from a source mobile node to a destination mobile node, directly or via at least one intermediate mobile node, on the basis of stabilities of different paths between the source and destination mobile nodes in a mobile ad hoc network, comprising:
   calculating a stability of each path using link stabilities between neighbor mobile nodes on the path;
   comparing the path stabilities of different routes between the source mobile node and the destination mobile node according to the stability of each path; and
   selecting the path having a highest stability among the different routes between the source mobile node and the destination mobile node, in order to use the route with maximum lifetime, wherein the step of calculating stabilities of the links on each path comprises:
   estimating a link mobility state between the neighbor mobile nodes ;
   accumulating successively the link mobility states;
   estimating link mobility parameters using successively accumulated link mobility states;
   predicting a link availability probability using the estimated link mobility parameters; and
   obtaining the link stability from the predicted link availability probability; and
   tracking continuously a link stability metric of nodes being on a path between the pair of mobile nodes after transmitting packets between the pair of mobile nodes using the predicted link availability probability,
   wherein the link mobility state is determined by a relative distance, a relative velocity, and a relative acceleration between the pair of mobile nodes.

10. The method of claim 9, wherein the step of selecting the path includes:
   determining whether or not there is more than one mobile node having the highest stability;
   comparing hop counts of the paths having the highest stability; and
   choosing the path having a lowest hop count as the route.

11. The method of claim 9, wherein the path stability is determined by a stability of a weakest one among the links of the same path.

12. The method of claim 9, wherein the step of calculating the stability of each path includes:
   calculating stabilities of links on each path; and
   selecting a stability of a weakest link among the links as the path stability.

13. The method of claim 9, wherein the link mobility state is estimated with observation data received from each of neighbor mobile nodes.

14. The method of claim 13, wherein the observation data includes a received signal strength indicator (RSSI).

15. The method of claim 13, wherein the observation data includes Time-of-Arrival (TOA).

16. The method of claim 9, wherein the link mobility state is computed by an equation: $S_{n+1} = \text{Sgn}\langle AS_n + W_n \rangle_1 \cdot (As_n + W_n), \langle S \rangle_1$ denotes a first component of a vector s, $$A = \begin{bmatrix} 1 & T & T^2/2 \\ 0 & 1 & T \\ 0 & 0 & \alpha \end{bmatrix},$$

T denotes a sampling interval between $s_n$ and $s_{n+1}$, $\alpha$ is a parameter of a mobility model, $W_n = [W_{n,1}, W_{n,2}, W_{n,3}]'$ is a 3×1 discrete-time zero mean, white Gaussian process with autocorrelation function $R_w(k) = \delta_k Q$ where $\delta_0 = 1$ and $\delta_k = 0$ when $k \neq 0$, and ' is the matrix transpose operator.

17. The method of claim 16, wherein the link mobility parameters are A and Q.

18. The method of claim 17, wherein wherein the link availability probability is computed by an equation:

$$p_{n+1|n} \triangleq P[d_{n+1|n} \leq d_{th}]$$

$$= \frac{1}{\sqrt{2\pi\sigma_{n+1|n}}} \int_0^{d_{th}} e^{\frac{-(x-\hat{d}_{n+1|n})}{2\sigma_{n+1|n}^2}} dx$$

$$= Q\left(\frac{d_{th} - \hat{d}_{n+1|n}}{\sigma_{n+1|n}}\right) - Q\left(\frac{-\hat{d}_{n+1|n}}{\sigma_{n+1|n}}\right)$$

where $d_{th}$ is transmission/reception range of mobile nodes, $$Q(x) \triangleq \frac{1}{\sqrt{2\pi}} \int_x^\infty e^{-y^2/2} dy$$

denotes the standard Q-function, $d_{n+1|n}$ and $\sigma_{n+1|n}$ are predicted link distance and standard deviation at time n+1 with observations up to time n.

* * * * *

UNITED STATES PATENT AND TRADEMARK OFFICE
CERTIFICATE OF CORRECTION

| | |
|---|---|
| PATENT NO. | : 8,335,207 B2 |
| APPLICATION NO. | : 11/321071 |
| DATED | : December 18, 2012 |
| INVENTOR(S) | : Shubhranshu Singh et al. |

It is certified that error appears in the above-identified patent and that said Letters Patent is hereby corrected as shown below:

On the title page:

Item (75) Inventors, Replace "Vamit Suri" with "Varnit Suri"

Signed and Sealed this
Eighteenth Day of June, 2013

Teresa Stanek Rea
*Acting Director of the United States Patent and Trademark Office*